July 23, 1968  MAKOTO OKUDA  3,393,865
DIGITAL INPUT MEANS FOR COMPUTING MACHINES
Filed April 26, 1966  2 Sheets-Sheet 1

INVENTOR
MAKOTO OKUDA
BY *Nathan H. Kraus*
*Frank H. Morks*
Attorneys

July 23, 1968  MAKOTO OKUDA  3,393,865
DIGITAL INPUT MEANS FOR COMPUTING MACHINES
Filed April 26, 1966  2 Sheets-Sheet 2
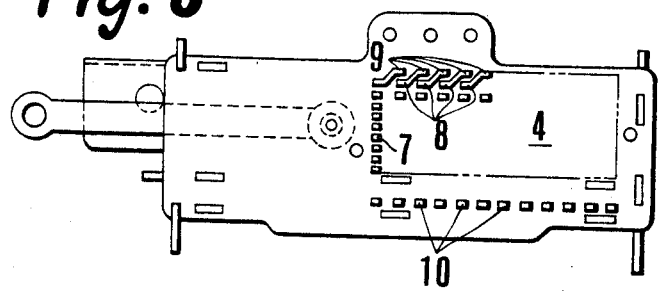
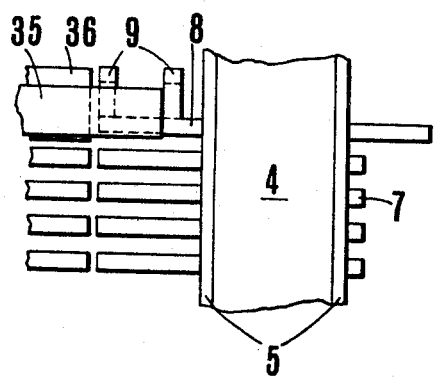
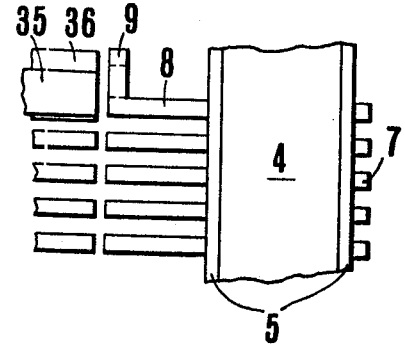
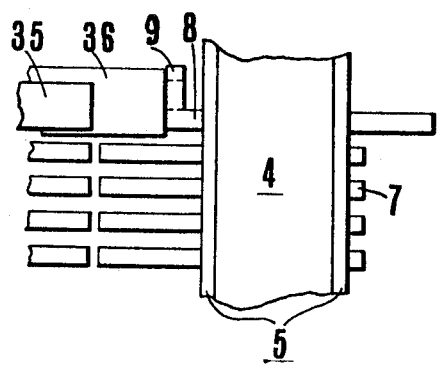
INVENTOR
MAKOTO OKUDA
BY Nathan N. Kraus
Frank H. Marks
Attorneys United States Patent Office 3,393,865
Patented July 23, 1968

3,393,865
DIGITAL INPUT MEANS FOR COMPUTING MACHINES
Makoto Okuda, Osaka, Japan, assignor to Maruzen Sewing Machine Co. Ltd., Osaka, Japan
Filed Apr. 26, 1966, Ser. No. 552,364
8 Claims. (Cl. 235—60)

This invention relates to improvements in digital input means for computing machines and the like.

One of the objects of this invention is the provision of means in a computing machine for selectively entering composite digits upon the actuation of a single key.

Another object of this invention is the provision of means in a computing machine for automatically indexing the movement of the stop pin carriage in accordance with the composite digits entered in the machine.

A further object of this invention is the provision of the aforedescribed means which is simple in construction, efficient in operation and trouble free in service.

Other and further objects and advantages of this invention will become apparent from the following description when the same is considered in connection with the accompanying drawings in which, FIG. 1 is a perspective view of a digital input mechanism in accordance with my invention with parts removed and broken away to more clearly illustrate the invention.

FIG. 3 is a front elevational view of a stop pin carriage illustrated in FIGS. 1 and 2.

FIG. 4 is a fragmentary side elevational view, on an enlarged scale, of the stop pin carriage and the cooperating elements associated therewith.

FIGS. 5 and 6 are views similar to FIG. 4 but showing the parts in different operative positions.

Figure 1:
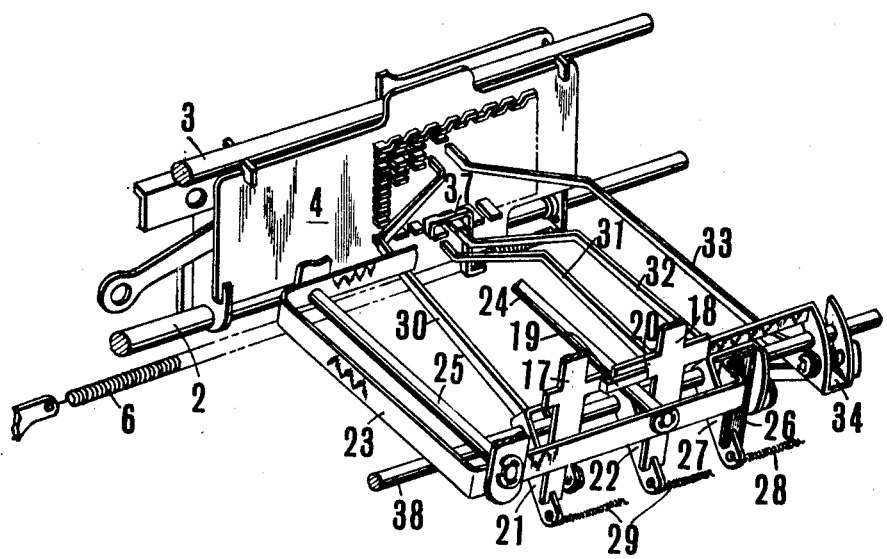

In the drawings and in the following specification, only so much of the computing machine and its mode of operation as is necessary for an understanding of the present invention and its advantages are shown and described.

Referring to the drawings, the numeral 1 indicates a pair of side frame plate members of a computing machine in which are supported transverse lower and upper guide bars 2 and 3, respectively. A stop pin carriage 4, hereinafter to be described, is transversely reciprocable on said guide bars 2 and 3. A spring 6 connected to the pin carriage and to one of the side plates 1 normally urges the pin carriage to the left, as viewed in FIG. 1.

The pin carriage 4 includes a pair of spaced front and rear parallel plates 5, 5 having registering perforations to receive a plurality of vertical rows of conventional longitudinally movable pins 7. Disposed at the top of each of the rows of pins 7 in vertical registration therewith are pins 8 each having an upwardly offset portion 9 overhanging and extending into registration with a row of pins of the next lower denominational order, as viewed in FIG. 3. Below each of the rows of pins 7 and in vertical registration therewith is a stop pin 10. The pins 7, 8 and 10 are longitudinally slidable and effect operation of conventional mechanism, not shown, in a well known manner. It will be understood that some of the pins have been eliminated from the drawings merely for convenience.

Figure 2:
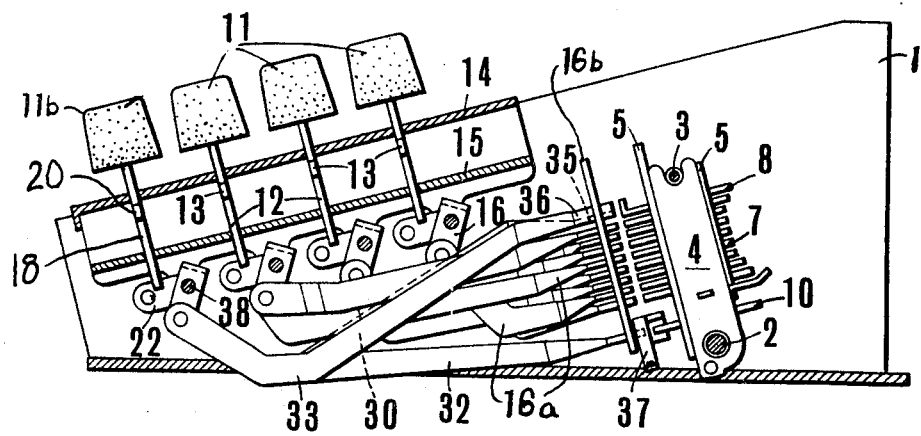
FIG. 2 is a left hand elevational view of the mechanism illustrated in FIG. 1 partly in cross-section with parts removed to illustrate the structural features of the invention.

Referring to FIG. 2, a plurality of keys 11, each provided with a stem 12 are mounted for sliding movement in suitable slots formed in the key plates 14 and 15. Each of the stems 12 is provided with a lateral extension 13 which in addition to other functions hereinafter to be described serves to retain the keys in assembled relation in the key plates. Each of the stems 12 is slotted at its lower end to engage against a respective bell crank 16 pivotally connected to a respective tappet lever 16a, the distal end portions of which extends through a slot in a plate 16b. Each bell crank 16 is biased by a spring not shown in a direction to urge the key 11 upwardly to the position illustrated in FIG. 2. As will be apparent, depressing of any of the numeral keys 11 will cause the end of a respective tappet lever 16a to engage against a respective pin 7 to move said pin to the right as viewed in FIG. 2. The keys 11 comprise a bank of nine keys corresponding to the numerals 1 through 9.

A pair of keys 11a and 11b, the former not being shown, corresponding to the "0" and composite "00" denominations are surmounted on stems 17 and 18, respectively, which are supported for sliding movement in the key plates 14 and 15 in the same manner as the stems 12. Referring to FIG. 1 it will be seen that the stem 17 is provided with an offset lateral arm 19 and a stem 18 is provided with a lateral arm 20. Both arms are disposed above a bar 24 which is secured in the legs of a generally U-shaped rocking frame 23 pivotally supported on a shaft 25, the ends of which are secured in brackets attached to the frame of the machine. The lower ends of the stems 17 and 18 are slotted to engage against bell cranks 21 and 22, respectively, which are rockable about a transverse shaft 38. Springs 29 secured to the bell cranks 21 and 22 urge said bell cranks in a counterclockwise direction, as viewed in FIG. 1 so that the keys associated with the stems 17 and 18 normally are in the position illustrated in FIG. 2. A bell crank 27 is supported on shaft 38 and the rocking frame 23 is provided with a depending extension 26 which is slotted at its lower end to engage against the bell crank 27. A spring 28 urges the extension 26 upwardly in a direction so that the bar 24 normally is maintained in abutment with the arms 19 and 20. Although not specifically illustrated, it will be understood that the lateral extensions 13 associated with each of the stems 12 are of such length that they overhang the bar 24 and are in engagement therewith. As each key 11 is depressed its lateral extension 13 is moving downwardly with its respective stem effects a downward rocking of the frame 23 in opposition to the spring associated with each of the bell cranks 16.

Referring to FIG. 1, the bell crank 21 is pivotally connected to the tappet lever 30 which is shaped substantially as illustrated and has a distal end 35 disposed in registration with the line of pins 8 in the pin carriage 4. As will be seen clearly in FIG. 4, the distal end 35 has a depth such that when it is engaged against one of the pins 8, as illustrated in FIG. 5, the upper end thereof is clear of the horizontal offset portion 9 of the pin 8 in an adjacent row of pins of the next higher denominational order. Thus, when the distal end 35 engages against a pin 8 only that pin will be actuated and will be caused to move to the right, as viewed in FIG. 5.

The bell crank 22 is pivotally connected to tappet levers 32 and 33 and bell crank 27 is pivotally connected to tappet lever 31. The tappet lever 33 is shaped substantially as illustrated in FIG. 1 and its distal end 36 is disposed in vertical registration with a row of pins 8 of the next lower denominational order. Said distal end also is disposed in horizontal alignment with the pins 8 and offset portions 9, and as seen clearly in FIGS. 4 and 5, the distal end 36 has a greater depth than the distal end 35 such that when the tappet lever 33 is caused to be actuated to engage the pin 8 of one row it will also engage the offset overhanging portion 9 of an adjacent pin in the row of the next higher denominational order to the left of the pin being actuated, as viewed in FIG. 3. Thus, it will be apparent that the actuation of a single key 11b will effect actuation of two adjacent pins 8, 8 to set up a composite double "00" entry in the machine.

The tappet levers 31 and 32 are shaped substantially as illustrated in FIG. 1, with the respective distal ends of said levers being in registration with adjacent pins 10 in the lowermost row of pins on the pin carriage 4. Said pins cooperate with a fixed stop element 37 to effect indexing of the pin carriage in a manner, as will be hereinafter described.

When it is desired to enter a single "0" in the machine, key 11a is depressed. Its associated key stem 17 in moving downwardly rocks bell crank 21 which moves the tappet arm 30 in a direction wherein the distal end 35 engages a single pin 8 and moves the same to the right, as viewed in FIG. 2. Correspondingly, arm 19 of the stem 17 will engage bar 24 rocking the frame 23 clockwise, as viewed in FIG. 1, so that the depending extension 26 will rock the bell crank 27 to move the tappet lever 31 to engage a pin 10 and to move the same to the right, as viewed in FIG. 2. The pin 10 will be clear of the stop member 37 so that the carriage 4 may be moved by the spring 6 one row and indexed to the row of the next lower denominational order whereupon the pin in such row will engage the stop 37 and arrest movement of the carriage 4.

It will be understood that the pin carriage 4 is caused to be moved and indexed one row of pins upon the actuation of each of the digit keys 11, since the lateral extensions 13 of each of the associated stems 12 overhang the bar 24 and upon the downward movement of each of the stems 12 the frame 23 is caused to rock in the manner hereinabove described to rock the crank arm 27 to effect movement of the tappet lever 31 into engagement with a registering pin 10.

Assuming now that it is desired to set up a composite "00" in the machine, by depressing key 11b its associated stem 18 will rock bell crank 22 in a counterclockwise direction, as viewed in FIG. 2, to move the tappet lever 33 in a direction to engage a pin 8 in registration therewith. As seen clearly in FIG. 6, the depth of the distal end 36 of the tappet lever 33 is of such magnitude that it will engage not only the portion of the pin 8 in registration therewith but also the overhanging offset portion 9 of the pin in the row of the next higher denominational order. Thus, two pins 8 are actuated by the single actuation of one key 11b. Concurrent with the movement of tappet lever 33, tappet lever 32 is moved to engage a pin 10 in registration therewith to move the same so that it clears stop 37. Also arm 20 when the steam 18 is depressed will engage bar 24 and rock the frame 23 to move the tappet lever 31 to engage the stop pin 10 which is in registration therewith, to move the said pin to clear stop 37. Thus, by reason of the actuation of the single key 11b two pins 8 in adjacent rows and two stop pins 10 in adjacent rows are caused to be actuated and the pin carriage 4 is caused to be moved and indexed two rows of pins.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. In a computing machine, a movable stop pin carriage having a series of stop pins arranged in progressively decreasing denominational orders in relation to the movement of said carriage, certain of said pins having an offset extension overhanging an adjacent pin of the next lower denominational order and each said extension being disposed in spaced vertical registration with such adjacent pin, digital input means including a pair of keys each operatively associated with a respective tappet lever, one of said levers when actuated by a respective key being adapted to depress only a single one of said pins to cause to be entered in said machine a single digit and the other of said levers when actuated by a respective key being adapted to depress simultaneously one of said pins and a registering overhanging extension to cause to be entered in said machine composite digits.

2. The invention as defined in claim 1 in which the pin carriage includes a series of indexing pins in columnar registration with respect stop pins, and means operable by said keys to depress respective indexing pins to index the movement of said pin carriage in accordance with the denominational order of the digits entered in said machine.

3. In a computing machine, a movable stop pin distal end of the first mentioned lever has a dimensional size such as to engage only a single pin and the distal end of said second mentioned lever has a dimensional size such as to engage a pin and a registering overhanging extension.

4. The invention as defined in claim 1 in which one of said keys corresponds to a "0" value and the other of said keys corresponds to a composite "0—0" value.

5. In a computing machine, a movable stop pin carriage having a first series of stop pins arranged in progressively decreasing denominational order in relation to the movement of said carriage, said carriage having a second series of indexing pins, each arranged in columnar registration with a respective stop pin of the first series, certain of said stop pins each having an offset extension overhanging an adjacent pin of the next lower denominational order and each said extension being disposed in spaced vertical registration with said adjacent pin, digital input means including first and second keys, a first tappet lever operatively connected to said first key and adapted when actuated by said first key to depress one of said stop pins to cause to be entered in said machine a single digit, a second tappet lever operatively connected to said second key and adapted when actuated by said second key to depress simultaneously one of said stop pins and a registering overhanging extension to cause to be entered into said machine composite digits, a third tappet lever adapted when actuated to depress one of said indexing pins to index the movement of said pin carriage one columnar space to the next lower denominational order, a fourth tappet lever adapted when actuated to depress an adjacent indexing pin located in a column of the next lower denominational order, means operative by the actuation of either of said first or second keys for actuating said third tappet lever, whereby upon the actuation of said first key there will be caused to be entered in said machine a single digit and the carriage indexed to move one columnar space and upon the actuation of said second key there will be caused to be entered in said machine composite digits and the carriage indexed to move two columnar spaces.

6. The invention as defined in claim 5 in which the means operative by either of said first or second keys includes a rocking frame, and arms carried on the key stems and engageable with said frame.

7. The invention as defined in claim 5 in which the distal end of the first tappet lever has a dimensional size such as to engage only a single pin and the distal end of the said second tappet lever has a dimensional size such as to engage a pin and a registering overhanging extension.

8. The invention as defined in claim 5 in which said first key corresponds to a "0" value and said second key corresponds to a composite "0—0" value.

References Cited

UNITED STATES PATENTS

| 2,062,963 | 12/1936 | Benninger | 235—60 |
| 3,066,862 | 12/1962 | Zimmermann | 235—60 |
| 3,155,315 | 11/1964 | Giampiero et al. | 235—60 |

STEPHEN J. TOMSKY, *Primary Examiner.*

UNITED STATES PATENT OFFICE
CERTIFICATE OF CORRECTION

Patent No. 3,393,865

July 23, 1968

Makoto Okuda

It is certified that error appears in the above identified patent and that said Letters Patent are hereby corrected as shown below:

Column 4, line 27, "respect" should read -- respective --; line 32, "5. In a computing machine a movable stop pin" should read -- 3. The invention as defined in claim 1 in which the --.

Signed and sealed this 9th day of December 1969.

(SEAL)
Attest:

Edward M. Fletcher, Jr.
Attesting Officer

WILLIAM E. SCHUYLER, JR.
Commissioner of Patents